J. HOFFMAN.
Assignor to J. RECKENDORFER.
Lead and Crayon Holder.
No. 8,968. Reissued Nov. 18, 1879.
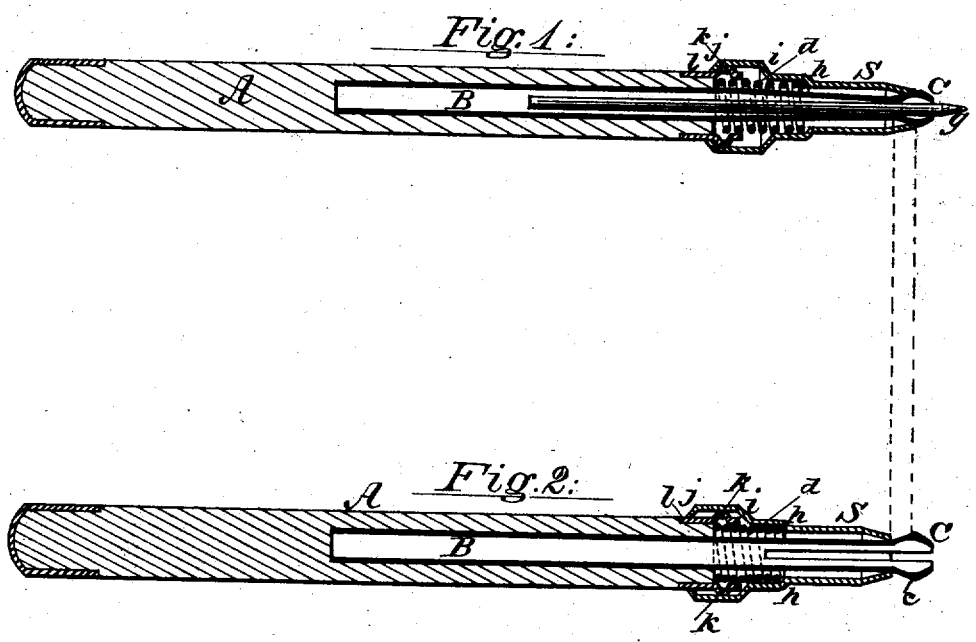
Witnesses:
Inventor:
Joseph Hoffman,
by W. Bailey
his Atty.
N. PETERS, PHOTO-LITHOGRAPHER, WASHINGTON, D. C.

UNITED STATES PATENT OFFICE.

JOSEPH HOFFMAN, OF NEW YORK, N. Y., ASSIGNOR TO JOSEPH RECKENDORFER, OF SAME PLACE.

IMPROVEMENT IN LEAD AND CRAYON HOLDERS.

Specification forming part of Letters Patent No. 215,521, dated May 20, 1879; Reissue No. 8,968, dated November 18, 1879; application filed October 22, 1879.

DIVISION B.

*To all whom it may concern:*

Be it known that I, JOSEPH HOFFMAN, of the city, county, and State of New York, have invented certain new and useful Improvements in Lead and Crayon Holders, of which the following is a specification.

My invention relates to that class of pencil or lead and crayon holders in which a split tube or holder or clamping-jaws are caused to contract or close upon the lead by the longitudinal movement of an external clamping-sleeve.

For this purpose I combine with the pencil holder or handle, having the usual central bore and tube split at its lower end for receiving and clamping the lead, a ferrule rigidly attached to the exterior of the lower end of the handle, and provided with a shoulder, and a clamping tube or sleeve constructed to fit and slide upon said ferrule, and provided at its upper end both with a shoulder or flange, which acts in connection with the shoulder on the ferrule, and also with a contracted lower end, to grasp the split tube or jaws when moved in the proper direction longitudinally on the same, substantially as hereinafter set forth.

I also combine with the elements above specified a spring, which tends to push said clamping tube or sleeve in the direction requisite to cause it to close or grasp the said split tube or jaws.

The nature of my invention, and the manner in which the same is or may be carried into effect will be readily understood by reference to the accompanying drawings, in which—

Figure 1 is a longitudinal central section of a holder embodying my improvements with the jaws closed. Fig. 2 is a like section of the same with the jaws expanded.

A is the sheath or handle, provided with the usual bore or lead-receiving tube B, which tube is split at its front end to form elastic clamping-jaws C.

The jaws are constructed to nip or bite the lead or article placed between them, and are formed externally with a tapered or inclined part, *c*, the taper being from front to rear, as shown.

Rigidly attached to the exterior of the lower or front end of the handle is a ferrule, *l*, which is provided with a flange, bead, or shoulder *k*.

A clamping sleeve or tube, S, is held in place by, and takes its bearing on, the ferrule *l*, being arranged so that it may slide longitudinally upon said ferrule, its forward movement being limited by a shoulder, *j*, which brings up against the shoulder *k* on the ferrule. The rearward movement of the clamping-sleeve is limited by another shoulder or abutment, *i*.

The sleeve is provided with a contracted front end, which surrounds the lead-receiving tube or jaws, and, when the sleeve is pushed in the proper direction, acts on the swelling or tapered part of said jaws to cause the latter to close on and grasp the lead.

In order to push the sleeve upon the tapered part of the jaws, I employ a spiral spring, *d*, which is confined between the front end of the handle A and a shoulder or stop, *h*, on the sleeve S.

To release the lead all that is needed is to draw the sleeve away from the tapered part of the jaws.

What I here claim, and desire to secure by Letters Patent, is—

1. In combination with the pencil-holder having the usual central bore and tube split at its lower end for receiving and clamping the lead, a ferrule rigidly attached to the exterior of the lower end of the handle, and provided with a shoulder, and a clamping tube or sleeve constructed to slide upon the fixed ferrule, said sleeve or tube being provided with a shoulder or flange, arranged to act in connection with the shoulder on the fixed ferrule to limit the forward movement of the sleeve, and with a contracted lower end to grasp the split tube or jaws when pushed in the proper direction, substantially as and for the purpose described.

2. The combination, with the sheath or handle, the lead-receiving jaws, and the sliding clamping-sleeve, of the spring, arranged within the sleeve and confined between said sleeve and handle, substantially as and for the purposes shown and set forth.

In testimony whereof I have hereunto set my hand this 18th day of October, A D. 1879.

JOSEPH HOFFMAN.

Witnesses:
C. S. BRAINERD,
JOE W. SWAINE.